2 Sheets—Sheet 1.

J. A. EBERHARDT.

Process and Apparatus for Mashing Grain.

No. 8,907. Reissued Sept. 30, 1879.

Inventor.

John A. Eberhardt by James H. Layman his Attorney.

Attest,

Louis A. Roth

John Butler

J. A. EBERHARDT.

Process and Apparatus for Mashing Grain.

No. 8,907. Reissued Sept. 30, 1879.

Inventor.
John A. Eberhardt
By James H. Layman
his Attorney

Attest:
Louis A. Roth
John Reuler

UNITED STATES PATENT OFFICE.

JOHN A. EBERHARDT, OF CINCINNATI, OHIO.

IMPROVEMENT IN PROCESSES AND APPARATUS FOR MASHING GRAIN.

Specification forming part of Letters Patent No. 215,811, dated May 27, 1879; Reissue No. 8,907, dated September 30, 1879; application filed July 21, 1879.

*To all whom it may concern:*

Be it known that I, JOHN A. EBERHARDT, of Cincinnati, Hamilton county, Ohio, have invented a new and useful Process and Apparatus for Mashing Grain, of which the following is a specification.

The object of my invention is to prepare mash for direct introduction to the fermenting-tubs without exposing the mixed corn, rye, and malt, or other grain, to the injurious action of the atmosphere, thereby obtaining the greatest possible yield of sugar from the mash, and preventing as far as possible the formation of those acids which constitute a considerable percentage of the yield of mash prepared by processes heretofore in use. I accomplish this result by mixing the malt with the grain *in vacuo*, thereby preparing the mash for direct introduction to the fermenting-tubs without exposing it to the injurious action of the atmosphere, to which the formation of the acids above referred to is mainly, if not entirely, due.

The grain may be prepared in any known or suitable way to bring it to the proper condition to receive the malt; but I prefer to prepare it in the same vessel or receptacle in which it is afterward mixed with the malt.

The form of apparatus which I prefer to use in carrying out my process is shown in the annexed drawings, in which—

Figure 1:
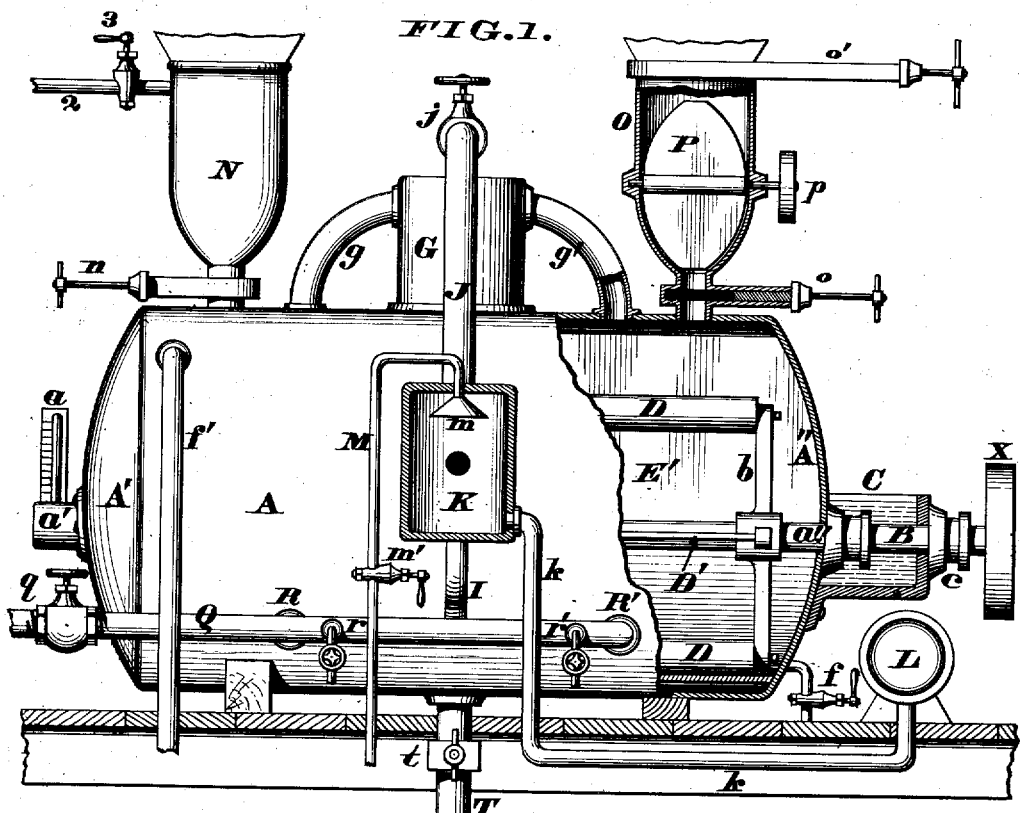
Figure 1:
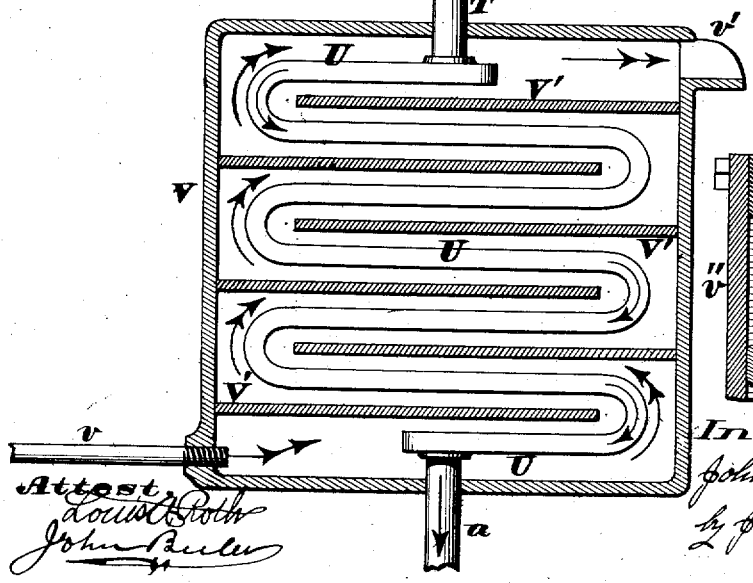
Figure 3:
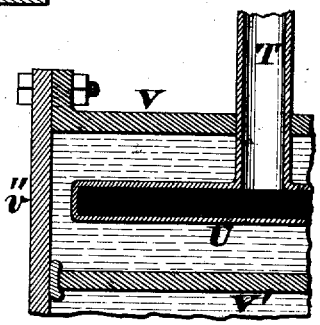
Figure 2:
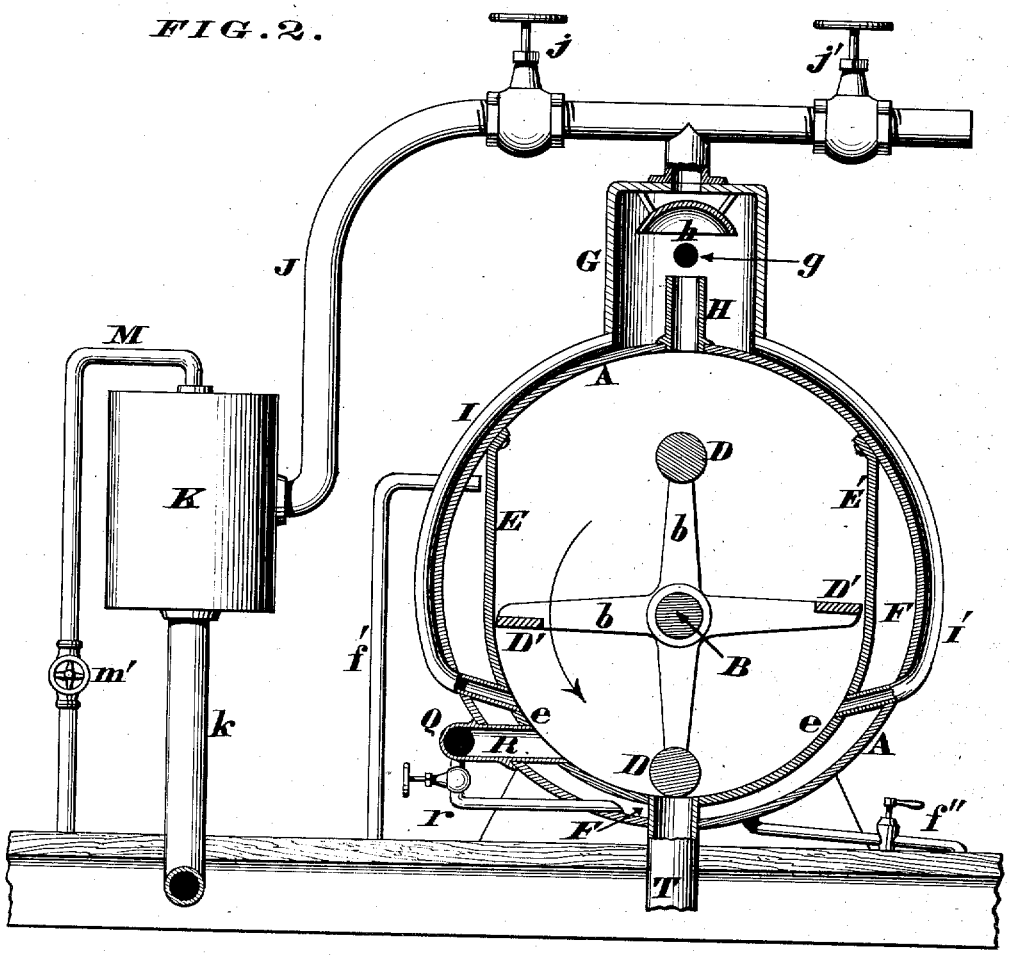
Figure 4:
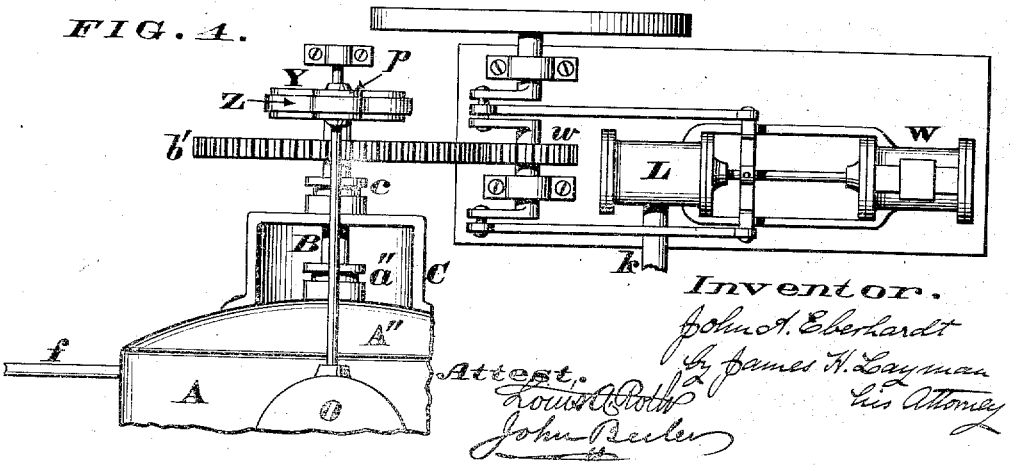

Figure 1 is a sectionized elevation of said apparatus, the cooler of the same being drawn on an enlarged scale. Fig. 2 is an enlarged transverse section taken in the plane of the discharge-pipe of the mash-tun proper. Fig. 3 is a transverse section of a portion of the cooler; and Fig. 4 is a plan, showing the preferred mode of gearing the air-pump engine to the agitator and stirrer of the apparatus.

The principal member of my apparatus is a tank, A, of any suitable size and shape, and stout enough to resist the necessary pressure of steam, which pressure may vary according to the kind or quality of grain employed. This tank is preferably cylindrical, and has two heads, A′ A″, whose bearings *a′ a″* have journaled in them the revolving shaft B of an agitator, the construction of which latter will be fully described hereinafter.

Bearing *a′*, whose outer end is closed, has applied to it a thermometer, *a*, for indicating the temperature of the mash-tun, while the other bearing, *a″*, serves as a stuffing-box.

Attached to head A″ is a trough, C, filled with water or oil or other fluid, to insure an air-tight joint at bearing *a″*. *c* is a stuffing-box of said trough.

Shaft B is provided with arms *b*, or otherwise arranged to carry a series of rollers, D, and scrapers D′, which devices D D′ are adapted to revolve in close contact with the concave bottom *e* of the mash-tun proper, whose sides or walls E E′ are about vertical, and are united to the interior of cylinder A, as shown in Fig. 2.

Furthermore, this mash-tun is so located in cylinder A as to afford a space or jacket, F, at the bottom and both sides of said tun, but not at the ends of the same, the ends being fitted up close to heads A′ A″.

Applied to the top of cylinder A, and preferably at the mid-length of the same, is a dome, G, whose branch pipes *g g′* communicate with said cylinder and dome. Situated axially within this dome is a main pipe, H, whose upper or discharging end is protected by a shield or deflector, *h*, of any suitable shape.

Proceeding from the bottom of said dome, and communicating with the mash-tun E E′, are return-pipes I I′, of which pipes one or more may be employed. Furthermore, this dome has an eduction-pipe, J, controlled by a cock, *j*, said pipe being adapted to lead the steam from mash-tun E E′ to a condenser, K, which latter has attached to it a pipe, *k*, communicating with an air-pump, L, or other suitable exhauster. M is the cold-water pipe for this condenser, said pipe being furnished with a rose, *m*, and cock *m′*. *j* is the blow-off valve of the apparatus.

N is the hopper for corn and rye, and all other grain used except the malt, and *n* is the gate of this hopper. O is the special hopper for malt, which hopper has two gates, *o o′*, and a stirrer, P, the latter being secured to a shaft driven by a belt passing around pulley *p*, or otherwise. Q is the main steam-pipe, having a throttle-valve, *q*, and two inlets, R R′, which inlets discharge directly into mash-tun E E′. *r r′* are valved branch pipes for admitting steam into the chamber F, which jacket may, at the proper moment, be filled with water by a pipe, *f*. *f'* is the overflow-pipe of said chamber, and *f''* is the drain-pipe of the same. The inlet *f* is attached to the under side of cylinder A, and near the head A'', while the outlet *f'* is connected to the upper side of said tank and near the opposite end, A', in order to insure the most complete circulation of cold water within jacket F when the mash is to be cooled.

Mash-tun E E' has a discharge-pipe, T, provided with a gate, *t*, and said pipe communicates with the cooler. This cooler consists of a broad but very shallow coiled pipe or chamber, U, terminating with an outlet, *u*, that discharges directly into the fermenting-tubs; and said cooler is housed within a casing or box, V, provided with water-inlet *v* and outlet *v'*.

V' are partitions that compel the water to take a circuitous passage in flowing through the box V, as indicated by the double-headed arrows, while the contrary current of mash is represented by the single-headed arrows. The sides *v''* may be bolted to the box, so as to be readily detached when coil U needs inspecting or repairing.

The preferred method of operating pump L is by a steam-engine, W, having a pinion, *w*, that gears with the spur-wheel *b'* of agitator-shaft B; or this shaft may have a pulley, X, to receive a driving-belt. Shaft B may project beyond the wheel *b'* and carry a pulley, Y, around which to pass a band, Z, for driving the stirrer-pulley *p*.

2 is a pipe, and 3 a cock, for admitting water to the corn and rye hopper N.

The operation of this form of my apparatus is as follows: Cock 3 is first opened, and sufficient water is allowed to run into the mash-tun E E', after which act said cock is closed, and gate *n* is opened to charge said tun with corn and rye, about a quart of water being admitted for every pound of grain. When tun E E' has been properly charged, gate *n* is shut, and all the other cocks and valves being then closed, throttle-valve *q* is opened to admit steam to said tun and its jacket F, so as to subject the corn and rye to a thorough and uniform cooking process.

Simultaneously with the opening of cock 3, shaft B is revolved in the direction of the arrow seen in Fig. 2, the rollers D serving to crush and grind the grain, while the scrapers D' agitate the mass and prevent it adhering to the bottom and sides of the tun. This cooking process continues about three-quarters of an hour, or long enough to convert the heated grain into starch, at which time throttle-valve *q* is closed, and proper steps are then taken to reduce this starch to a suitable temperature preparatory to admitting the malt. The first step in this operation consists in opening the blow-off valve *j'*, to allow the escape of steam and vapor, after which discharge of vapor said valve is closed, the one *j* opened, and air-pump L started, water being at the same time turned into condenser K and jacket F.

While blowing off the vapor, any particles of mash that may be carried along with the currents of steam rushing through the pipes *g* *g'* H are arrested by deflector *h*, and, descending within the pipes I I', re-enter the tun E E'. As this tun is now surrounded with cold water, and as the agitator is constantly in motion, it is evident the starch is soon cooled sufficient to receive the malt, the temperature being indicated by the thermometer *a*. Eduction-valve *j* is then closed and gate *o* opened, thereby causing the stirrer P to discharge the proper quantity of malt into the cooled starch, which is now *in vacuo*, about three or four bushels of malt being used for every one hundred bushels of corn and rye. The agitator continues to revolve about fifteen minutes longer, so as to cause an intimate mixture of the malt and starch, after which time the blow-off valve *j'* and gate *t* are opened, and the finished mash is now discharged through pipe T into cooler U, from whence the mash flows directly into the fermenting-tubs, and is then treated in any approved way. Cock *f* is now closed, the one *f''* opened to drain the jacket F, and the above-described operations are repeated with the same results.

From the above description it is seen that the malt mixes with the starch while the latter is *in vacuo*, and consequently the mash is free from acids and yields a more copious and superior article of spirits.

Another advantage is the rapidity with which the mash is prepared, as the run can be made in from two to two and one-half hours less time than by the old process, thus economizing fuel and saving considerable labor.

Furthermore, the corn, rye, malt, &c., are introduced into the tun E E' without being ground, thereby preventing injury of the grain, and insuring better results in mashing.

The arrangement of the mashing-tun within its enveloping-cylinder is advantageous on many accounts, and enables me to readily and quickly bring the grain to a proper condition to receive the malt. The shaft B, that carries the mashing-rollers and scrapers, being located in the axis of the cylindrical or lower part of the tun, these rollers and scrapers are thus compelled to travel in contact with said concave part, the scrapers serving to detach the mash from the sides of the tun and carry it along, and, finally, as they rise, to drop it and let it fall back in front of said rollers. As soon, however, as these scrapers pass beyond the concave surface they enter a part of the tun where they are no longer in contact with the same, this part of the tun being elevated, and containing the openings through which the grain and malt enter, said openings being thus out of reach of the scrapers and rollers, which consequently cannot act in any way to obstruct them. As the arms *b* of the agitator project rigidly from its axial shaft B, it is evident the rollers D and scrapers D′ sweep around in close proximity to the concave bottom *e* of the inclosed tun E E′, thus rendering it impossible for the mash to adhere to said bottom; and, as such an adhesion would soon render the apparatus inoperative, the necessity of this rigid construction of said arms will be apparent at a glance.

It is desirable to boil the grain under pressure, and preferably by direct contact with steam; but were the tun required to withstand internal pressure, it would, owing to its irregular form, soon be expanded on the sides, and consequently the surfaces against which the rollers and scrapers are required to act would expand and become separated from them. This tendency, however, I neutralize by jacketing the tun, as shown, the jacket having a cylindrical form, and by introducing into this jacket steam to counteract the steam-pressure within the tun. By this arrangement I am enabled to use high heat and considerable pressure in conjunction with revolving mashers or crushers and scrapers, which act against only the lower part of the tun.

As the principal feature of my invention consists in incorporating the malt with the corn and rye while the latter are *in vacuo*, the right is reserved of modifying or completely changing the appliances herein shown and described, as I do not propose to limit myself to any special form of apparatus, provided this leading feature of the invention is retained. In some cases spiral blades or other appliances may be combined with the rollers and scrapers to insure a more thorough agitation of the mash, or two or more agitators may be journaled in the tun E E′, and a system of staybolts may be used for securing said tun within the cylinder A.

I am aware it is not new to construct coolers of convoluted pipes arranged in a water box or tank, as such devices are seen in several patents. Such being the state of the art, my claim to this part of the apparatus is not designed to be construed broadly, but is expressly limited to the combination, in a water-box, of a broad shallow pipe with horizontal partitions between the various convolutions of the same, in order that the mash which descends by gravitation may be opposed by an ascending current of water flowing around said coils and partitions, and finally escaping at or near the top of the box, as herein illustrated.

I am also aware it is not new to provide mixing-machines with rollers journaled on spring-arms so as to yield. Therefore my claim to the agitator is limited to the construction herein illustrated and described—that is to say, to an axial shaft carrying a series of rollers and scrapers, which are applied to arms projecting rigidly from said shaft, so as to maintain these devices D and D′ in close proximity with the bottom of tun E E′ *e*, and thereby prevent mash adhering to the same.

I claim as my invention—

1. In mashing grain, the process of preventing the formation of acids in the mash, which consists in mixing the malt with the grain *in vacuo*, substantially as set forth.

2. The process of effecting the admixture of the malt with the grain *in vacuo*, which consists in boiling the grain in a close vessel under pressure, then exhausting the air and steam from said vessel, and, finally, introducing the malt and incorporating it with the grain, substantially as set forth.

3. In combination with the external cylinder and the mash-tun formed and arranged within said cylinder, substantially as described, the revolving mashers and scrapers moving in contact with the curved lower part of said mash-tun, substantially as set forth.

4. In a mashing apparatus, the combination, substantially as set forth, of the cylinder, the trough-shaped mash-tun secured at its upper edges to the inside of the cylinder, and steam-pipes which conduct steam into both the mash-tun and the space or chamber intervening between it and the external cylinder, whereby pressure within and without the tun may be equalized.

5. The combination of the mash-tun, the heating appliances therefor, the pump or equivalent means for producing a vacuum, the separate grain and malt hoppers, and the valves and gates which regulate steam admission and exhaust and close the tun and the hoppers, whereby the grain may be boiled and mashed and the malt introduced into the tun and mixed with the grain *in vacuo*, substantially as shown and set forth.

6. A mashing apparatus combining the following elements, to wit: a closed mash-tun located within a steam-tank and provided with a revolving agitator, suitable appliances for charging and emptying said tun, devices for admitting steam to the tank and tun, and devices for producing a vacuum in the latter for the purpose of mixing malt and grain *in vacuo*, substantially as herein described.

7. The closed mash-tun E E′, located in a steam-tank, A, and jacket F, said tun having a concave bottom, *e*, and a revolving agitator, for the purpose specified.

8. In combination with a mash apparatus, an agitator consisting of a shaft, B, carrying a series of rollers, D, and scrapers D′, said rollers and scrapers being applied to arms *b*, projecting rigidly from said shaft, for the purpose specified.

9. In combination with tank A and an inclosed mash-tun, the dome G, having one or more pipes, I I′, for returning to said tun any upwardly-projected particles of mash, as described.

10. In combination with a mash apparatus comprising a tank, an inclosed mash-tun, and a steam-jacket, the dome G, pipes I I′, and shield *h*, which shield deflects into said pipes and returns to the inclosed tun any ascending particles of mash, as herein described.

11. In combination with a mash apparatus, a cooler consisting of a broad shallow pipe, U, coiled within a box, V, which box is provided with horizontal partitions V′, supply-pipe *v*, and outlet *v′*, said partitions, pipe, and outlet being arranged as herein described, in order that the descending current of mash may be opposed by an ascending current of water, for the object stated.

12. In combination with a mash apparatus comprising a tank, an inclosed mash-tun, and a steam-jacket, the pipes *g g′* H, communicating with said inclosed tun and dome G, in the manner herein described, and for the purpose set forth.

In testimony of which invention I hereunto set my hand.

JOHN A. EBERHARDT.

Witnesses:

JAMES H. LAYMAN,

LOUIS A. ROTH.